United States Patent
Csapo et al.

(10) Patent No.: US 7,561,896 B2
(45) Date of Patent: Jul. 14, 2009

(54) METHOD AND SYSTEM FOR ORIGINATION SIGNALING IN A WIRELESS NETWORK

(75) Inventors: John Csapo, Dallas, TX (US); Purva R. Rajkotia, Plano, TX (US); William J. Semper, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 11/191,161

(22) Filed: Jul. 27, 2005

(65) Prior Publication Data

US 2007/0026877 A1 Feb. 1, 2007

(51) Int. Cl.
*H04B 1/38* (2006.01)

(52) U.S. Cl. .......... 455/558; 455/404.1; 455/550.1; 455/518; 455/519; 455/521; 370/312; 370/432

(58) Field of Classification Search ............... 455/558, 455/414.1, 518, 519, 550.1, 552.1, 560, 561, 455/432.1, 432.2, 432.3, 433, 551, 456.1, 455/456.2, 456.3, 456.4, 456.5, 456.6, 517, 455/522, 116, 574, 521, 404.1, 553.1, 567; 370/916, 331, 312, 349, 432
See application file for complete search history.

(56) References Cited

U.S. PATENT DOCUMENTS

| | | | |
|---|---|---|---|
| 5,983,114 A * | 11/1999 | Yao et al. ............ 455/509 |
| 6,333,921 B1 * | 12/2001 | Grube et al. ............ 370/312 |
| 6,360,093 B1 * | 3/2002 | Ross et al. ............ 455/414.1 |
| 6,799,057 B1 * | 9/2004 | Liverotti ............ 455/558 |
| 6,801,777 B2 * | 10/2004 | Rusch ............ 455/452.2 |
| 6,850,777 B1 * | 2/2005 | Estes et al. ............ 455/558 |
| 7,130,610 B2 * | 10/2006 | Dolezal et al. ............ 455/404.1 |
| 2002/0067707 A1 * | 6/2002 | Morales et al. ............ 370/331 |
| 2004/0192364 A1 * | 9/2004 | Ranalli et al. ............ 455/517 |
| 2005/0119016 A1 * | 6/2005 | Neumann ............ 455/466 |
| 2005/0124364 A1 * | 6/2005 | Rao et al. ............ 455/518 |
| 2005/0186937 A1 * | 8/2005 | Graham ............ 455/404.1 |
| 2005/0208979 A1 * | 9/2005 | Kim ............ 455/566 |
| 2006/0211450 A1 * | 9/2006 | Niekerk et al. ............ 455/558 |
| 2007/0021132 A1 * | 1/2007 | Jin et al. ............ 455/518 |

* cited by examiner

*Primary Examiner*—Charles N Appiah
*Assistant Examiner*—Olumide T Ajibade Akonai

(57) ABSTRACT

A method for origination signaling in a wireless network is provided. The method includes receiving a delayed feature request at an input device. The delayed feature request is directly provided from the input device to an override chip. An invitation message that is operable to request establishment of a delayed feature session is generated in the override chip based on the delayed feature request. The invitation message is sent to a base station.

20 Claims, 3 Drawing Sheets

METHOD AND SYSTEM FOR ORIGINATION SIGNALING IN A WIRELESS NETWORK

TECHNICAL FIELD OF THE INVENTION

The present invention is directed in general to wireless communication networks and, more specifically, to a method and system for origination signaling in a wireless network.

BACKGROUND OF THE INVENTION

The use of cellular telephones and wireless networks has become increasingly widespread. As the use of cellular telephones has increased, the number and quality of additional features made available with the cellular telephones has also increased. For example, many cellular telephones now provide a "walkie-talkie" type of feature in which users may communicate with a selected person or group of people by pushing a button on the telephone. This feature is often referred to as "Push-To-Talk."

The Push-To-Talk (PTT) feature is useful for situations in which users want or need to communicate with the same person or group of people repeatedly but not continuously. For example, a group of people at a mall may desire to keep in touch with each other after they split up to shop separately. Using Push-To-Talk, one person may quickly contact another person or other people without having to make a conventional cellular phone call.

The parties involved must first establish a PTT service between their respective phones. The wireless network is then aware of the presence of each mobile station (e.g., cell phone) involved in the PTT service, although no traffic channels are set up. The mobile stations initially communicate with the base stations of the wireless network using only overhead control channels to establish the PTT service. Once the PTT service is established, the call originator does not have to dial the number of the called party in order to communicate. The call originator only needs to press a button, wait for a beep (or a similar indicator), and then speak. Advantageously, many service providers do not charge these conversations against the users' allotted usage minutes for the cellular telephones.

Many conventional PTT services use Internet Protocol (IP) transport to provide PTT service. IP packets are transported between the wireless network and the originating and terminating mobile stations over a Radio Link Protocol (RLP) link (i.e., network layer) after traffic channels are set up. Immediately after the call originator pushes the button to initiate a PTT call, the wireless network verifies that the call terminating (or target) mobile station is still present on the network. If the target mobile station is still present, the wireless network sets up the physical layer of a traffic channel between the originating mobile station and the network base station. The physical layer of a traffic channel between the wireless network and the target mobile station is also set up at the same time. The physical layers of the traffic channels enable the originating and target mobile stations to receive and send data frames.

Next, the wireless network establishes a Radio Link Protocol (RLP) link layer between the originating and target mobile stations. The RLP link transports the IP packets on top of the data frames of the physical layers of the traffic channels. Finally, the wireless network sends to the originating mobile station a Flow Grant message. The Flow Grant message is sent in IP packets over the RLP link. When the originating mobile station receives the Flow Grant message, it emits the beep or other indicator that informs the user (i.e., call originator) that the user may begin speaking.

However, there may be some significant latency (i.e., delay period) between the time when the user pushes the button to start using the PTT service and the time when the user receives a beep that indicates the user may speak. This latency is related to the initial delay in setting up the physical layer of the traffic channel between the wireless network and the originating mobile station and the further delay of setting up the network layer (i.e., the RLP link) between the originating mobile station and the wireless network. As a result, conventional cellular telephones may have delays of more than one second between the time that the user pushes the button and the time that the beep is provided. Such a delay can become annoying to the user and detracts from the PTT service.

Therefore, there is a need in the art for an improved Push-to-Talk service having a reduced latency. In particular, there is a need for an improved wireless network and mobile stations that reduce the latency in originating a Push-to-Talk or other type of delayed service session.

SUMMARY OF THE INVENTION

In accordance with the present invention, a method and system for origination signaling in a wireless network are provided that substantially eliminate or reduce disadvantages and problems associated with conventional methods and systems.

According to one embodiment of the present invention, a method for origination signaling in a wireless network is provided. According to an advantageous embodiment of the present invention, the method includes receiving a delayed feature request at an input device. The delayed feature request is directly provided from the input device to an override chip. An invitation message that is operable to request establishment of a delayed feature session is generated in the override chip based on the delayed feature request. The invitation message is sent to a base station.

According to one embodiment of the present invention, the invitation message is generated by constructing a message that comprises an identifier for a mobile station that includes the override chip, spreading a first physical layer frame for the message for a pseudo-channel, and coding the first physical layer frame for the pseudo-channel.

According to another embodiment of the present invention, the identifier for the mobile station comprises a Universal Access Terminal Identifier according to the 1xEV-DO air interface standard.

According to still another embodiment of the present invention, the method also includes passing the first physical layer frame to a multiplexing/demultiplexing (MD) module.

According to yet another embodiment of the present invention, the method also includes receiving a second physical layer frame from an air interface chip at the MD module and replacing the second physical layer frame with the first physical layer frame to generate a pseudo-channel frame.

According to a further embodiment of the present invention, the invitation message is sent to the base station by sending the pseudo-channel frame to the base station.

According to a still further embodiment of the present invention, the method also includes enabling the override chip when a mobile station that includes the override chip is within the coverage area of the wireless network and disabling the override chip when the mobile station is outside the coverage area of the wireless network.

According to yet a further embodiment of the present invention, the invitation message comprises a 16-byte identifier for a mobile station that includes the override chip and a 1-byte invitation code that is operable to identify a type for the delayed feature request.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
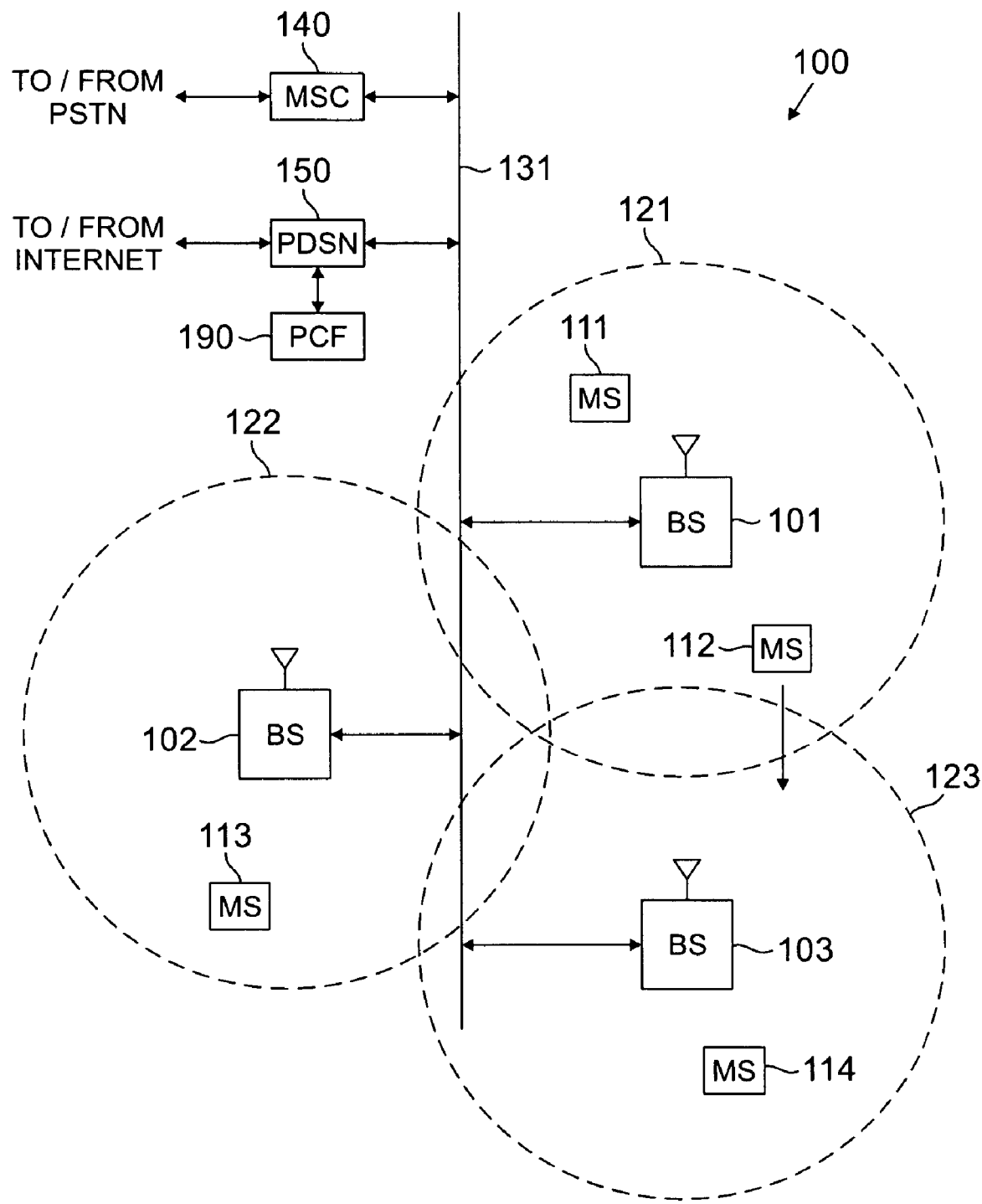
FIG. 1 illustrates an exemplary wireless network in which origination signaling may be provided according to the principles of the present invention.
Figure 2:
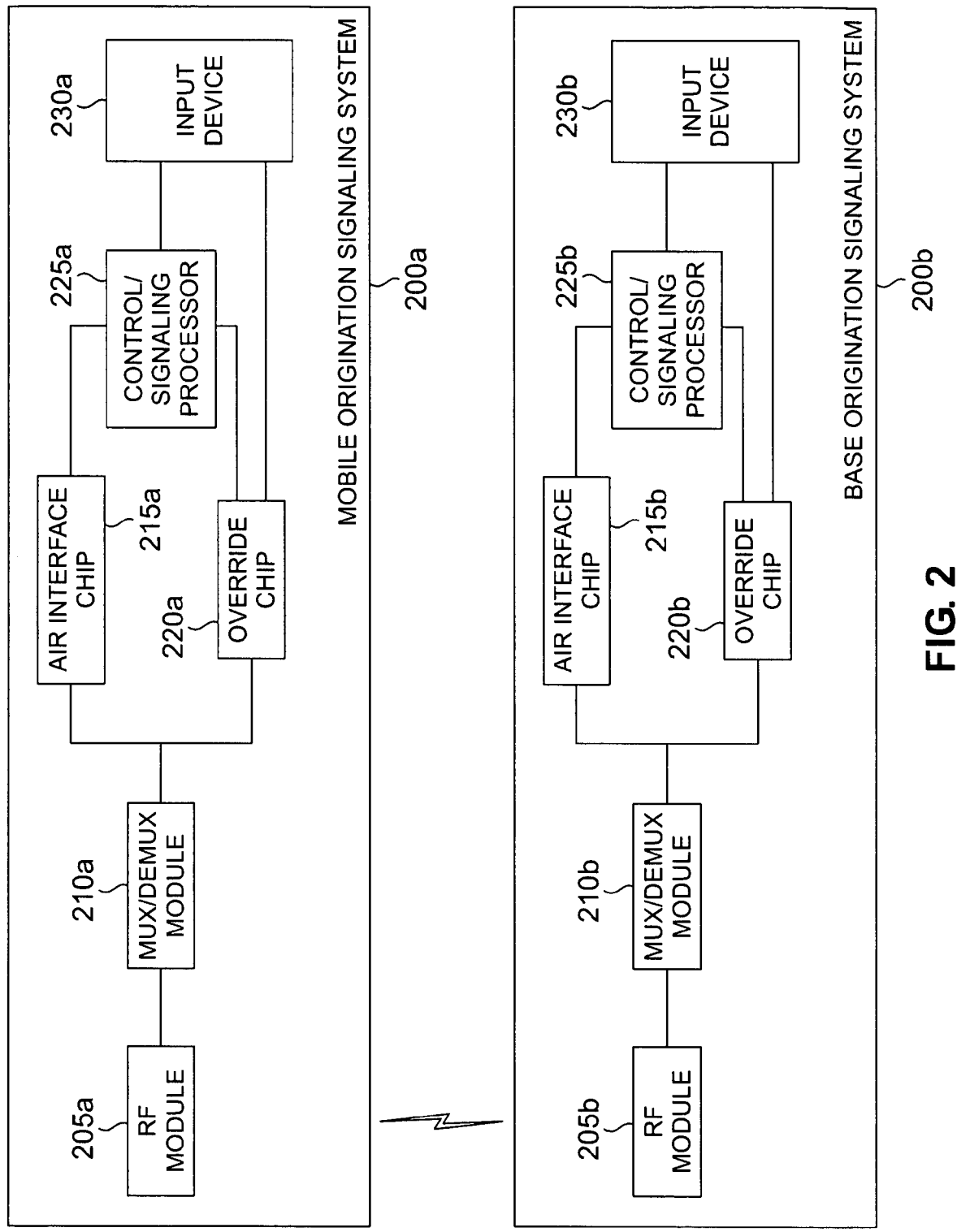
FIG. 2 illustrates origination signaling systems that are operable to provide origination signaling in the wireless network of FIG. 1 according to the principles of the present invention.
Figure 3:
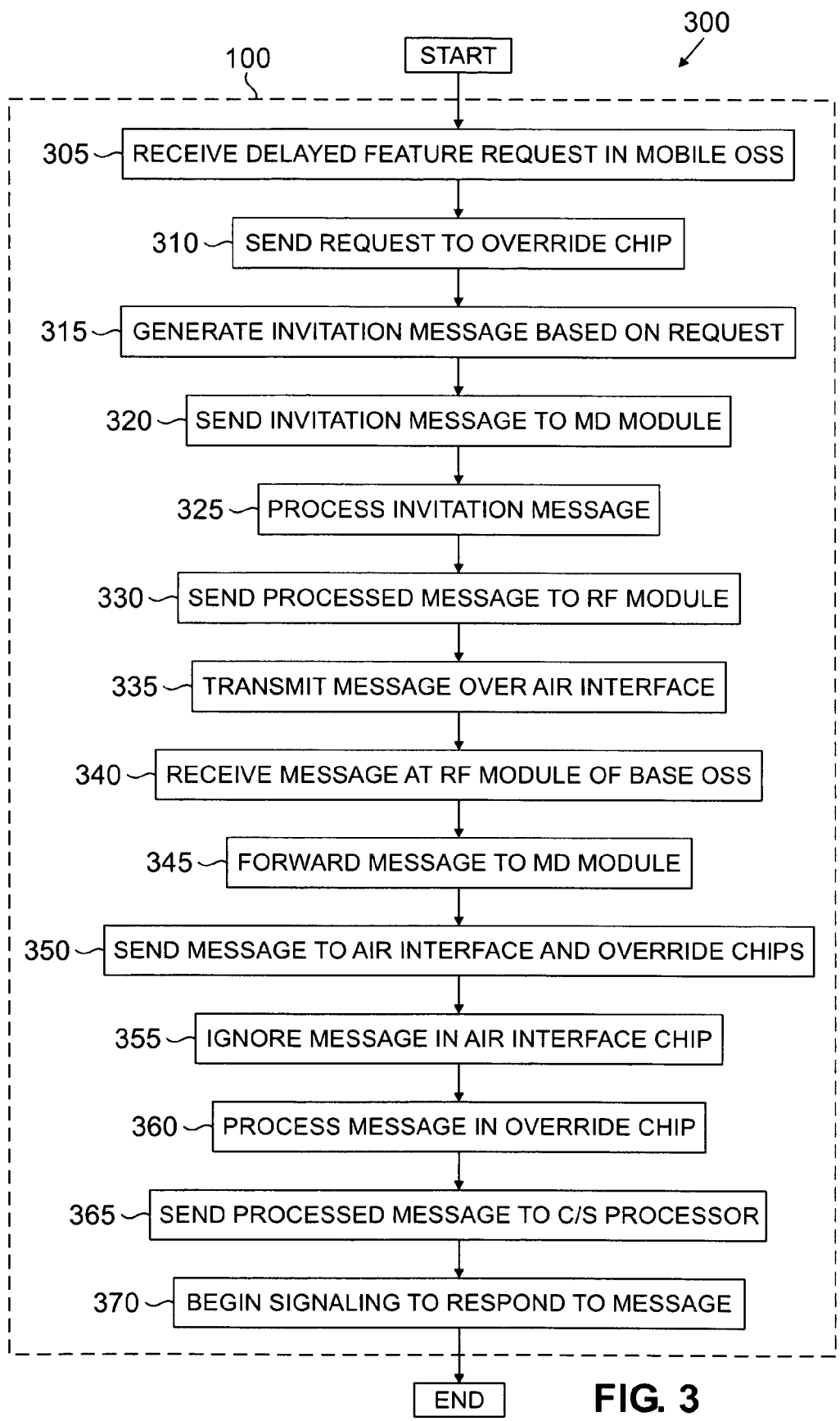
FIG. 3 is a flow diagram illustrating a method for origination signaling in the wireless network of FIG. 1 using the origination signaling systems of FIG. 2 in accordance with one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

FIG. 1 illustrates exemplary wireless network 100 in which origination signaling may be provided in accordance with principles of the present invention. The origination signaling may occur, for example, when an originating mobile station initiates a Push-To-Talk (PTT) session with a terminating mobile station. However, it will be understood that other types of time-sensitive sessions, such as emergency calls, Voice-over IP (VoIP) calls, Wireless Priority Service (WPS) calls, and the like, may also be initiated.

Wireless network 100 comprises a plurality of cell sites 121-123, each containing one of the base stations, BS 101, BS 102, or BS 103. In the exemplary embodiment, base stations 101-103 communicate with a plurality of mobile stations (MS) 111-114 over code division multiple access (CDMA) channels according to, for example, the IS-2000 standard (i.e., CDMA2000). In alternate embodiments, base stations 101-103 may communicate with mobile stations 111-114 according to other standards, such as GSM, OFDMA, or the like. In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

According to the principles of the present invention, base stations 101-103 and at least some of mobile stations 111-114 are operable to provide one or more delayed features for users of mobile stations 111-114. As used herein, a "delayed feature" refers to a push-to-talk (PTT), push-to-view, push-to-all, or other suitable feature, such as an emergency call, that is activated by the user of an originating mobile station and that has an associated delay in providing the feature that may be undesirable. Part of the delay is due to the time that elapses while the traffic channel is being established between the originating mobile station and a base station that serves the originating mobile station.

For the purposes of simplicity and clarity in explaining the operation of the present invention, it shall be assumed in the following example that base station 101 of wireless network 100 provides PTT service between mobile station 111 and mobile station 112. However, the descriptions that follow also apply to the remaining base stations and mobile stations in wireless network 100. Mobile station 111 sends a PTT session message to base station 101 in order to initiate the establishment of a PTT session with mobile station 112. Thereafter, either mobile station 111 or mobile station 112 may act as an originating (or source) mobile station by sending a PTT invitation message to base station 101 in order to initiate a PTT event with a terminating (or target) mobile station. In the example that follows, mobile station 111 is assumed to be the originating mobile station and mobile station 112 is assumed to be the terminating mobile station.

While a PTT session is established, mobile station 111 and mobile station 112 may communicate with each other in any number of PTT events. A PTT event refers to communication using the PTT feature between the users of mobile stations 111 and 112. After a PTT session is ended, another PTT session has to be established for the mobile stations 111 and 112 to communicate in subsequent PTT events. The PTT session message is operable to request that base station 101 establish a PTT session between mobile station 111 and mobile station 112 and others, if more than two mobile stations participate in the PTT session. Similarly, the PTT invitation message is operable to request that base station 101 establish a PTT event between mobile station 111 and mobile station 112. It will be understood that both the PTT session message and the PTT invitation message may actually comprise one or more communications between mobile station 111 and base station 101.

As described in more detail below, when a user requests the establishment of a PTT event or other delayed feature, originating mobile station 111 is operable to send the request to base station 101 over a pseudo-channel while a traffic channel is being established by using an override chip within mobile station 111. Base station 101 similarly comprises an override chip that is operable to respond to the request received over the pseudo-channel.

FIG. 2 illustrates a mobile origination signaling system (OSS) 200*a* and a base OSS 200*b* that are operable to provide origination signaling in wireless network 100 according to the principles of the present invention. Mobile OSS 200*a* is incorporated into at least some of mobile stations 111-114, and base OSS 200*b* is incorporated into each of base stations 101-103. For the purposes of simplicity and clarity in explaining the operation of the present invention, it shall be assumed in the following example that base OSS 200*b* is incorporated into base station 101 of wireless network 100 and that mobile OSS 200*a* is incorporated into originating mobile station 111. However, the description that follows also applies to any base stations and to at least some of mobile stations in wireless network 100.

Each OSS 200 comprises a radio frequency (RF) module 205, a multiplexer/demultiplexer (MD) module 210, an air interface chip 215, an override chip 220, and a control/signaling processor 225. Mobile OSS 200*a* also comprises an input device 230*a*, and base OSS 200*b* may comprise an input device 230*b* as well. The RF module 205 is operable to process the radio interface for the base station 101 or mobile station 111 in which OSS 200 is implemented and to transmit frames received from MD module 210.

MD module 210 is operable to receive signals from both air interface chip 215 and override chip 220. In standard operation, MD module 210 is operable to receive physical layer frames from air interface chip 215 and to forward those frames to RF module 205 for transmission. For a particular embodiment, the frame size and timing synchronization correspond to the 1xEV-DO air interface specification.

In originating a delayed feature, MD module 210*a* is operable to receive a frame from override chip 220*a*, to substitute this frame in place of a frame received from air interface chip 215*a*, and to send the substituted frame to RF module 205*a*. RF module 205*a* is operable to transmit frames received from override chip 220*a* at substantially full power in order to ensure delivery to base OSS 200*b*. MD module 210 is also operable to receive frames from RF module 205 and to send identical copies of those received frames to both air interface chip 215 and override chip 220.

For a particular embodiment, air interface chip 215 is operable to process received signals according to the 1xEV-DO air interface standard. However, it will be understood that air interface chip 215 may be operable to process received signals according to any suitable air interface standard without departing from the scope of the present invention.

Air interface chip 215 is also operable to forward processed signals to control/signaling processor 225. Air interface chip 215 ignores signals it is unable to decode, such as signals intended for override chip 220. Air interface chip 215 also is operable to receive messages from control/signaling processor 225, to encode the received messages for transmission over the air interface, and to send the encoded messages to MD module 210.

While override chip 220 is operable to process any received signal, override chip 220 is operable to decode only signals that are encoded for override chip 220, as described in more detail below. Override chip 220 is also operable to send the decoded signals to control/signaling processor 225.

For mobile OSS 200a, override chip 220a may also be directly coupled to input device 230a, which may comprise a keypad or other suitable user interface, such that when a user requests a delayed feature, input device 230a directly provides the request to override chip 220a. As used herein, "directly coupled" means that override chip 220a and input device 230a are coupled together without intervening components, and "directly provided" means that the request is provided from one component to the other component without being passed through intervening components. Override chip 220a is operable to forward this delayed feature request to MD module 210a for transmission over the air by RF module 205a.

Also for mobile OSS 200a, override chip 220a is operable to be enabled when mobile station 111 is within the coverage area of a base station, such as base station 101, that comprises a base OSS 200b and is operable to be disabled when mobile station 111 is within the coverage area of a base station that does not comprise a base OSS 200b.

Control/signaling processor 225 is operable to process information received from and sent to air interface chip 215 and override chip 220. Control/signaling processor 225 is also operable to control Layer-3 signaling.

In operation according to a particular embodiment, a user of mobile station 111 requests a delayed feature using input device 230a. Input device 230a sends the delayed feature request to override chip 220a, which constructs an invitation message and spreads and codes a physical layer frame for the invitation message accordingly for a new pseudo-channel. The invitation message comprises an identifier for mobile station 111, such as a Universal Access Terminal Identifier (UATI) as described in the 1xEV-DO air interface standard or other suitable identifier.

Override chip 220a then passes the physical layer frame to MD module 210a, which replaces a physical layer frame received from air interface chip 215a, if any, with the physical layer frame received from override chip 220a. MD module 210a then passes the physical layer frame to RF module 205a, which transmits the pseudo-channel frame over the air interface.

When the request is received at RF module 205b in base OSS 200b of base station 101, RF module 205b forwards the physical layer frame to MD module 210b, and MD module 210b sends the physical layer frame to both air interface chip 215b and override chip 220b. Air interface chip 215b ignores the frame because air interface chip 215b is unable to decode the frame.

Override chip 220b decodes the pseudo-channel, recognizes the invitation message, and forwards the identifier for mobile station 111 along with the invitation code to control/signaling processor 225b. Control/signaling processor 225b then begins the signaling to respond to the request from mobile station 111.

For this embodiment, the pseudo-channel used to carry the delayed feature request is essentially always available to mobile station 111 so that there is no delay in sending the call initiation signaling over the air interface. In addition, the pseudo-channel is transmitted at full power by mobile station 111 and may be spread with a specific Walsh code that is known to all mobile stations 111-114 and transmitted by base station 101. The pseudo-channel is also coded with the identifier for the mobile station 111-114 sending the request in order to distinguish between mobile stations 111-114.

For one embodiment, the invitation message may comprise 16 bytes for the mobile station identifier and one byte for the invitation code. For a particular embodiment, the byte comprising the invitation code may be coded as follows:

| Invitation Code | Delayed Feature |
| --- | --- |
| 00001111 | PTT |
| 10001010 | VoIP |
| 01010101 | WPS |
| 11001100 | Emergency Call |

However, it will be understood that the invitation code may be otherwise coded without departing from the scope of the present invention, In addition, fewer, more and/or other types of delayed features may be identified by the invitation code.

FIG. 3 is a flow diagram illustrating a method 300 for origination signaling in wireless network 100 using origination signaling system 200 in accordance with one embodiment of the present invention. For the purposes of simplicity and clarity in explaining the operation of the present invention, it shall be assumed in the following example that base station 101 of wireless network 100 is providing service to originating mobile station 111. However, the description that follows also applies to any base stations in wireless network 100 and to any mobile stations in wireless network 100 that comprise mobile OSSs 200a.

Initially, input device 230 in mobile OSS 200a of mobile station 111 receives a delayed feature request from a user of mobile station 111 (process step 305). For example, the user may press a designated key on input device 230a, enter a predefined code with input device 230a, select a menu item using input device 230a and/or otherwise use input device 230a to notify mobile station 111 of the requested delayed feature.

Input device 230a sends the delayed feature request to override chip 220a (process step 310). Override chip 220a generates an invitation message based on the delayed feature request (process step 315) and sends the invitation message to MD module 210a (process step 320). For an exemplary embodiment, override chip 220a generates the invitation message by first constructing a message that includes an identifier for mobile station 111 and then spreading and coding a physical layer frame for the message accordingly for a new pseudo-channel. For a particular embodiment, the identifier for mobile station 111 may comprise a Universal Access Terminal Identifier (UATI) as described in the 1xEV-DO air interface standard. For the exemplary embodiment, override chip 220a sends the invitation message to MD module 210a by passing the physical layer frame to MD module 210a.

MD module 210a processes the invitation message (process step 325) and sends the processed message to RF module 205a (process step 330) for transmission over the air interface (process step 335). For the exemplary embodiment, MD module 210a processes the invitation message by replacing a physical layer frame received from air interface chip 215a, if any, with the physical layer frame received from override chip 220a. For this same embodiment, RF module 205a transmits the request over the air interface by sending the pseudo-channel frame over the air interface.

The invitation message is then received at RF module 205b in base OSS 200b of base station 101 (process step 340), which forwards the message to MD module 210b (process step 345). For the exemplary embodiment, RF module 205b forwards the message to MD module 210b by forwarding the physical layer frame to MD module 210b. MD module 210b sends the message to both air interface chip 215b and override chip 220b (process step 350). For the exemplary embodiment, MD module 210b sends the message by sending the physical layer frame to both chips 215b and 220b.

Air interface chip 215b ignores the message because air interface chip 215b is unable to decode the message (process step 355). Override chip 220b processes the message (process step 360) and sends the processed message to control/signaling (C/S) processor 225b (process step 365). For the exemplary embodiment, override chip 220b processes the message by decoding the pseudo-channel and recognizing the message as an invitation message, and override chip 220b sends the message by forwarding the identifier for mobile station 111 along with the invitation code to control/signaling processor 225b.

Control/signaling processor 225b then begins the signaling to respond to the invitation message from mobile station 111 (process step 370). For example, control/signaling processor 225b begins the signaling to establish a PTT or other time-sensitive session as identified by the original delayed feature request, such as an emergency call, a Voice-over IP (VoIP) call, a Wireless Priority Service (WPS) call, or the like.

In this way, the delayed feature request may be transmitted in the form of an invitation message in parallel with the establishment of a traffic channel for communication, instead of being delayed until after the traffic channel has been established. This results in a reduction in the response to the request of at least 115 ms (13 ms for access slot wait delay, 26 ms for time to transmit data over signaling message and connection request on access channel, 26 ms for preamble transmit duration, 25 ms for transmit delay of DOS+CR+RU, and 25 ms for base station processing delay of DOS, Call Request and session retrieval time). In addition to this, time savings may be realized in the call response and base station processing delay. Since the invitation message is transmitted without using higher layer signaling, processing times for base station 101 should also be reduced. Finally, if the terminating mobile station also comprises a mobile OSS 200a, additional time savings will be realized.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network capable of communicating with a plurality of mobile stations in a coverage area of the wireless network, a method of origination signaling, comprising:
   receiving a delayed feature request at an input device;
   directly providing the delayed feature request from the input device to an override chip;
   generating an invitation message in the override chip based on the delayed feature request, the invitation message operable to request establishment of a delayed feature session; and
   sending the invitation message to a base station, wherein the invitation message comprises an identifier for a mobile station that comprises the override chip and an invitation code operable to identify a type for the delayed feature request, wherein the identifier comprises a 16-byte identifier and the invitation code comprises a 1-byte invitation code.

2. The method as set forth in claim 1, wherein the step of generating the invitation message further comprises: (i) constructing a message that comprises the
   identifier for the mobile station, the mobile station comprising the override chip, (ii) spreading a first physical layer frame for the message for a pseudo-channel, and (iii) coding the first physical layer frame for the pseudo-channel.

3. The method as set forth in claim 2, wherein the identifier for the mobile station further comprises a Universal Access Terminal Identifier according to a 1xEV-DO air interface standard.

4. The method as set forth in claim 2, further comprising passing the first physical layer frame to a multiplexing/demultiplexing (MD) module.

5. The method as set forth in claim 4, further comprising:
   receiving a second physical layer frame from an air interface chip at the MD module; and
   replacing the second physical layer frame with the first physical layer frame to generate a pseudo-channel frame.

6. The method as set forth in claim 5, wherein the step of sending the invitation message to the base station further comprises sending the pseudo-channel frame to the base station.

7. The method as set forth in claim 1, further comprising enabling the override chip when a mobile station comprising the override chip is within the coverage area of the wireless network and disabling the override chip when the mobile station is outside the coverage area of the wireless network.

8. For use in a wireless network capable of communicating with a plurality of mobile stations in a coverage area of the wireless network, a method of origination signaling, comprising:
   receiving an invitation message from a mobile station, the invitation message operable to request establishment of a delayed feature session for the mobile station;
   providing the invitation message to a first override chip and an air interface chip, the first override chip operable to decode invitation messages and the air interface chip operable to ignore invitation messages; and
   decoding the invitation message in the first override chip.

9. The method as set forth in claim 8, further comprising:
   providing the decoded invitation message to a control/signaling processor; and
   initiating establishment of the delayed feature session in the control/signaling processor based on the decoded invitation message.

10. The method as set forth in claim 8, wherein the invitation message comprises an identifier for the mobile station and an invitation code operable to identify a type for the delayed feature session.

11. The method as set forth in claim 10, wherein the identifier for the mobile station comprises a Universal Access Terminal Identifier according to a 1xEV-DO air interface standard.

12. The method as set forth in claim 10, wherein the type for the delayed feature session comprises one of a Push-to-Talk session, an emergency call, a Voice-over IP call, and a Wireless Priority Service call.

13. The method as set forth in claim 8, wherein the invitation message comprises a physical layer frame in a pseudo-channel frame.

14. The method as set forth in claim 8, further comprising enabling a second override chip in the mobile station when the mobile station is within the coverage area of the base station and disabling the second override chip when the mobile station is outside the coverage area of the base station.

15. The method as set forth in claim 8, wherein the invitation message comprises a 16-byte identifier for the mobile station and a 1-byte invitation code operable to identify a type for the delayed feature request.

16. For use in a wireless network capable of communicating with a plurality of mobile stations in a coverage area of the wireless network, a mobile station capable of providing origination signaling, the mobile station comprising:

an air interface chip operable to provide physical layer frames for transmission from the mobile station over an air interface;

an override chip coupled to the air interface chip, the override chip operable to provide substitute physical layer frames for transmission from the mobile station over the air interface; and a multiplexing/demultiplexing (MD) module coupled to the air interface chip and the override chip, the MD module operable to receive the physical layer frames from the air interface chip and the substitute physical layer frames from the override chip and to replace at least one of the physical layer frames with one of the substitute physical layer frames before transmission over the air interface.

17. The mobile station as set forth in claim 16, further comprising an input device directly coupled to the override chip, the input device operable to receive a delayed feature request from a user of the mobile station and to directly provide the delayed feature request to the override chip.

18. The mobile station as set forth in claim 17, wherein the override chip is further operable to generate an invitation message for a base station based on the delayed feature request by constructing a message that comprises an identifier for the mobile station, spreading a first substitute physical layer frame for the message for a pseudo-channel, and coding the first substitute physical layer frame for the pseudo-channel.

19. The mobile station as set forth in claim 18, wherein the invitation message comprises a 16-byte identifier for the mobile station and a 1-byte invitation code operable to identify a type for the delayed feature request.

20. The mobile station as set forth in claim 16, wherein the override chip is further operable to be enabled when the mobile station is within the coverage area of the wireless network and to be disabled when the mobile station is outside the coverage area of the wireless network.

* * * * *